United States Patent [19]

Stone

[11] 4,071,168
[45] Jan. 31, 1978

[54] LEVEL CONTROL SYSTEM FOR A ROTARY CONE-TYPE FEED HOPPER

[75] Inventor: Milton Stone, Chicago, Ill.

[73] Assignee: Pettibone Corporation, Chicago, Ill.

[21] Appl. No.: 679,211

[22] Filed: Apr. 22, 1976

[51] Int. Cl.² .................................. B67D 5/08
[52] U.S. Cl. ................................ 222/56; 141/95; 222/63; 222/64
[58] Field of Search ................. 222/52, 55, 56, 63, 222/64, 504, 168, 59, 65; 73/59; 141/95, 198

[56] References Cited

U.S. PATENT DOCUMENTS

| | | | |
|---|---|---|---|
| 2,568,332 | 9/1951 | Genovese | 222/56 X |
| 2,781,952 | 2/1957 | Mahoney | 222/168 |
| 3,149,650 | 9/1964 | Horst | 222/52 X |
| 3,207,373 | 9/1965 | Dannenmann | 222/504 X |
| 3,395,834 | 8/1968 | Troy | 222/63 |
| 3,866,799 | 2/1975 | Rikker et al. | 222/63 |
| 3,935,970 | 2/1976 | Spaw | 222/56 |

Primary Examiner—Stanley H. Tollberg
Assistant Examiner—Fred A. Silverberg
Attorney, Agent, or Firm—Norman H. Gerlach

[57] ABSTRACT

A level control system involving both an apparatus and a method for a rotary feed hopper of the inverted, open-ended, truncated cone-type, wherein heavy paste-like viscous material which is fed into the large open upper end of the feed hopper is delivered or discharged through the small lower end of the hopper. A load meter in connected relation with the motor which drives the hopper senses the power required to drive the hopper and thus indirectly indicates the quantity of the material in the hopper, and consequently, the height or level of the material. When the load on the motor reaches a predetermined maximum the feed of material to the hopper is discontinued thus preventing overflow. When the load on the motor reaches a predetermined minimum the feed of material into the hopper is resumed.

5 Claims, 1 Drawing Figure

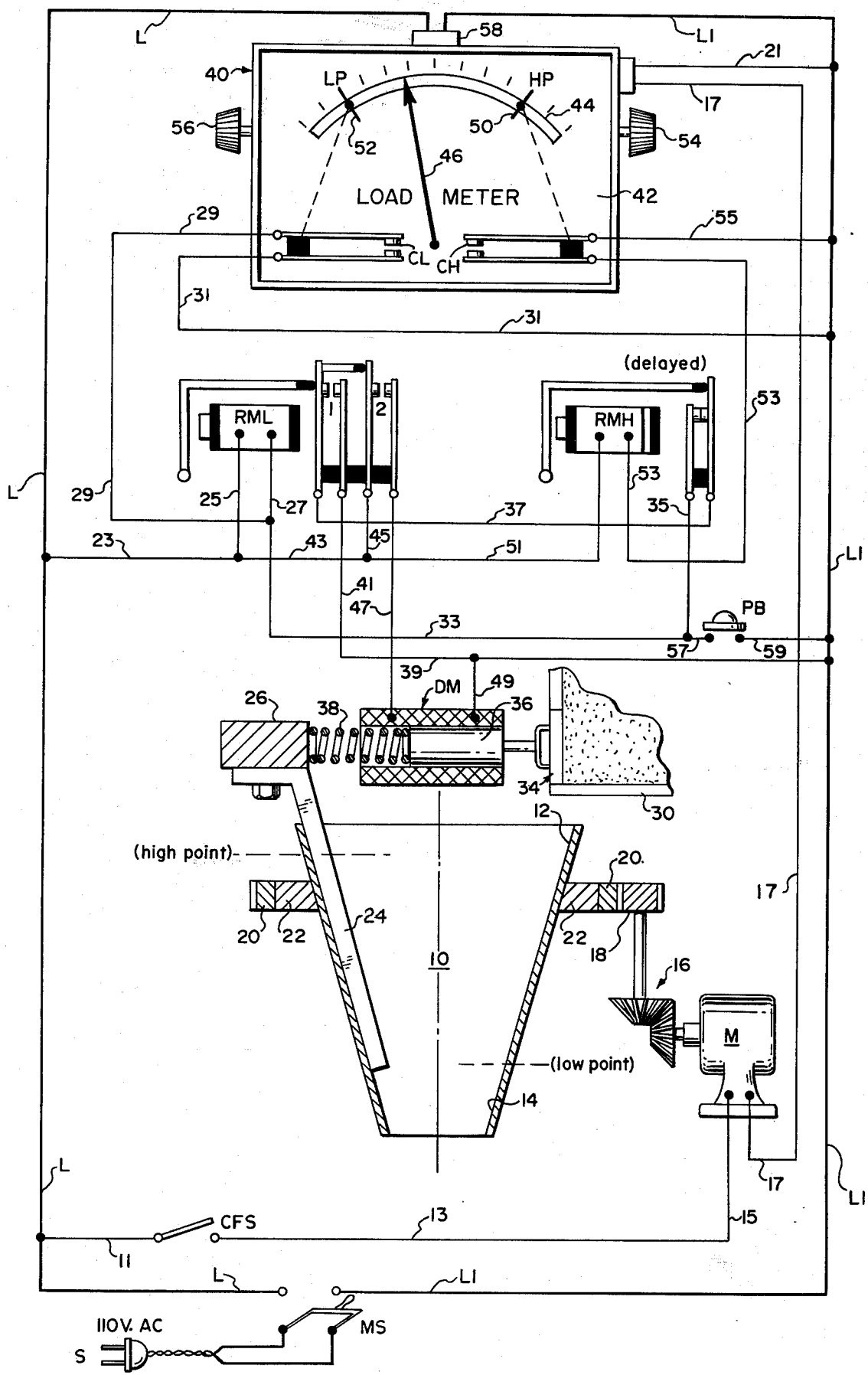

LEVEL CONTROL SYSTEM FOR A ROTARY CONE-TYPE FEED HOPPER

The present invention relates generally to automatic feeding devices and has particular reference to a rotary feed hopper of the general type which is illustrated and described in U.S. Pat. No. 2,781,952, granted on Feb. 17, 1957 and entitled "MATERIAL HANDLING APPARATUS." In such a feed hopper, heavy viscous material such as a lead oxide mixture which is used in connection with storage battery grids is fed to the larger upper open end of the rotating, inverted, frusto-conical feed hopper from a suitable mixer, the material, following processing in the hopper, being delivered by gravity from the small open end of the hopper to an automatic grid pasting machine. In its broadest aspect, the invention is specifically concerned with a load control system involving both an apparatus and a method whereby an indication of the quantity or mass of material which exists at any given instant within the feed hopper is available so that the issue of material from the mixer to the hopper may be discontinued if the level of material in the hopper becomes sufficiently high that there is danger of an overflow, and so that such issue of material may be restored when the level of material becomes sufficiently low that there is danger of the hopper becoming completely empty.

Beyond the mere indication of the quantity or mass of material which is contained within the hopper, the present invention further involves a fully automatic means whereby (a) when the critical height or level of such material in the hopper is reached so that there is danger of an overflow the feed of material to the hopper is automatically discontinued, and (b) when the critical low level of material in the hopper is reached, such feeding of material to the hopper is automatically resumed.

Heretofore, in connection with the use of a rotary, cone-type feed hopper of the type under consideration, various means have been devised to determine or sense the level of material in the hopper, among these being ultrasonic sensors which measure the length of time that it takes to pass a sound signal through the material in the hopper. Due to the conical shape of the hopper, the fact that the hopper is rotating, and the fact that the material tends to fall in large chunks or globs, such ultrasonic systems have proven somewhat less than satisfactory. The use of a float for determining the level of the material within the feed hopper is entirely impractical due to the shape and rotational characteristics of the hopper as outlined above, and also due to the fact that with large chunks of material sweeping about the conical hopper, the float is not constrained to seek a mean level. Furthermore, the fact that the conical hopper rotates while a stationary scraper is invariably disposed within the hopper to loosen the material from the hopper side wall, mechanical mounting facilities for any type of level sensing mechanism are rendered extremely difficult.

The present invention is designed to overcome the above-noted limitations that are attendant upon the construction and use of conventional level-sensing devices in connection with a rotary, cone-type, feed hopper of the type under consideration and, toward this end, the invention contemplates the provision of a novel load control system which operates upon the principle that the quantity or mass of material in the feed hopper is substantially in direct proportion to the power that is required to rotate the hopper. Thus, by sensing the amount of power which is required to drive the hopper at any given instant and rendering a visual indication thereof, the quantity of material within the hopper may readily be ascertained. With this knowledge, the operator may then discontinue the introduction of material into the hopper whenever the level of the material therein becomes dangerously high. Where an electric or a fluid motor is used for effecting rotation of the hopper, a conventional electric load meter or dynamometer or an hydraulic load meter may be connected to the motor and the movable pointer which is associated therewith will then indicate the quantity of material in the hopper. If the motor is electric, the electric load meter or dynamometer will have the aspects of a watt meter, whereas in the case of a fluid motor, the load meter will sense the back-up pressure of such motor and also the rate of fluid flow and the meter indicator or pointer will move accordingly.

Fully automatic control means for preventing overflow of the paste-like material in the feed hopper may be attained according to the present invention by sensing the power which is required to drive the feeder, utilizing for this purpose a load meter in the form of a dynamometer having a high set point and a low set point, such set points corresponding to respective different levels of the material in the hopper. The high set point is attained when the material level becomes sufficiently high that there is danger of an overflow being established. The low set point is attained when the material level in the hopper is such that very little paste material remains in the hopper. When the high set point is reached, automatic control circuitry is established resulting in discontinuing the supply of material from the mixer to the feed hopper. When the low set point is reached, other automatic circuitry is established resulting in again initiating a supply of material from the mixer to the feed hopper. Where batch feeding operations are desired as in the case of an intermittently-operable pasting machine, the low set point may under certain circumstances be omitted and the feed hopper permitted to run out of material in between batches. Where continuous pasting operations are resorted to, both the high and low set points will be used and the infeed of material to the hopper will, insofar as practicable, be adjusted to substantially equal the discharge of material so that long periods of hopper operation may be encountered where neither set point is reached, the load meter operating for prolonged or appreciable periods of time at some mid-point and the level of material in the hopper remaining fairly constant.

The provision of a material level control system which involves an apparatus and a method such as has briefly been outlined above, and possessing the stated advantages, constitutes the principal object of the present invention.

Numerous other objects and advantages of the invention, not at this time enumerated, will readily suggest themselves as the nature of the invention is better understood from a consideration of the following detailed description.

The invention consists in the several novel features which are hereinafter described and are more particularly defined by the claims at the conclusion hereof.

In the accompanying single sheet of drawing forming a part of this specification, one illustrative embodiment of the invention is shown.

In such drawing, the single view is entirely schematic in its representation and it discloses a rotary, inverted, frusto-conical, feed hopper, a mixer for supplying paste-like material thereto, a motor for rotating the hopper, and a control device which is responsive to the power utilized by the motor in driving the hopper, together with exemplary circuitry by means of which the control device is caused to discontinue the supply of material issuing from the mixer when overflow or high level conditions in the hopper become imminent, and to restore such material supply when the hopper requires refilling.

Referring now to the drawing in detail, a material feeding device is designated in its entirety by the reference numeral 10, is shown in vertical section, and is in the form of a rotary, inverted, truncated or frusto-conical, feed hopper having a relatively large material-receiving opening 12 at its upper end, and a relatively small material-discharging opening 14 at its lower end. An electric motor M operates through the medium of a pair of bevel gears 16, and a drive pinion 18 to apply torque to a ring gear 20. The latter surrounds and is suitably fixedly connected to a reinforcing and supporting ring 22 which is secured to the upper region of the hopper and is disposed exteriorly thereof. The inverted, frusto-conical, feed hopper 10 may be supported in any suitable manner for rotation about its vertical axis, as, for example, by means of rollers (not shown) which underlie the supporting ring 22.

Within the hopper 10 there is disposed an elongated, upwardly and outwardly inclined, scraping blade 24 the upper end of which is fixedly secured to a stationary support 26 above the hopper 10. Such blade closely hugs the slanting inside surface of the hopper so that, as the hopper rotates, the material which is contained therein is effectively loosened from the inner surface of the side wall of the hopper and caused to fall by gravity through the lower discharge opening 14.

The paste-like material is fed into the large, open, upper end of the hopper 10 from a superjacent material mixing apparatus which is fragmentarily shown in the drawing and is designated by the reference numeral 30, the material being discharged from the bowl of the apparatus through a side opening which is normally closed by gate means in the form of a door 34 which, if desired, may be in the form of a valve. The gate means or door is adapted to be moved to its open position under the control of an electromagnet DM at such time as the latter becomes energized. The electromagnet DM is provided with an elongated, horizontally slidable, core 36 one end of which is suitably connected to the door 34. Means 38 in the form of a helical compression spring is provided for normally urging the door to its closed position. When the door 34 is shifted to its open position, the material in the mixer is discharged through the discharge opening 32 and falls by gravity into the feed hopper 10.

Various forms of material mixing apparatuses may be employed for supplying paste-like material to the hopper 10, one such apparatus being shown and described in U.S. Pat. No. 3,980,282 granted Sept. 14, 1976 and entitled "MATERIAL MIXING APPARATUS." In such apparatus, the door corresponding to the door 34 of the mixing apparatus 30 is opened and closed by pneumatic means but in the present disclosure a magnetically-operable door or gate mechanism is shown in the interests of simplification. It will be understood that, as in the case of the aforementioned patent application, the material in the mixer 30 is forced outwardly from the door opening 32 due to the radial thrust which is produced by certain rotary mixing instrumentalities in the form of plows or the like which have not been disclosed herein.

The arrangement of parts thus far described is more or less conventional and no claim is here made to any novelty therein, the novelty of the present invention residing rather in the specific level control means or system whereby, when the level of material in the hopper 10 reaches a predetermined maximum where there is danger of an overflow, the door 34 of the mixing apparatus 30 will automatically become closed, and whereby, when the level of the material in the hopper reaches a predetermined minimum when the hopper is nearly empty, the door will automatically be opened so that the supply of material from the mixing apparatus to the hopper will be resumed.

It is deemed pertinent for a full understanding of the nature of the present invention to point out that due to the fact that the material issuing from the mixing apparatus 30 is highly viscous, heavy and thick, there is a tendency for it to pack within the hopper so that it will not readily flow therefrom through the small discharge opening 14. However, when the side wall of the feed hopper is scraped by means of the blade 24, the paste-like material will flow freely from the lower end of the hopper and into the grid pasting machine therebeneath, provided, of course, that the hopper 10 is in rotation. Immediately upon cessation of rotation of the feed hopper 10, the flow of the material therefrom ceases.

Considering now the particular control system of the present invention, a conventional load meter 40 is operatively connected to the motor M in such a manner that it will sense the power which is required by such motor to drive the feed hopper 10. In the case of an electric motor, this power will be measured in watts. Various load meters capable of being used for this purpose are commercially available, one such meter which has found to be satisfactory for use in connection with the present invention being manufactured and sold by Larson Instrument Company, Inc. of Orangeburg, N.Y. and designated as Model No. CMC 4.5. Briefly, such a load meter 40 is in the form of a dynamometer and it includes a visible panel 42 with an arcuate scale 44 and, in addition, an associated pointer 46 which is pivoted so that its distal end is capable of sweeping throughout the entire length of the scale. As used according to the present invention, the pointer is responsive to the power which is developed by the motor M and the scale may conveniently be calibrated in measurements of the mass in pounds of material in the feed hopper 10, or in measurements of the height of the material in inches. High and low limit control circuitry within the load meter housing is such that the instant that the input signal moves the pointer 46 to or beyond the low set point which is evidenced by a set point indicator 52, another control circuit is energized by closure of a pair of contacts CL. This second control circuit will remain effective only as long as the pointer is on the low side of such set point indicator 52 and as soon as it returns to a point above the low set point, the circuit will automatically become deenergized. Stated otherwise, the contacts CH will become closed only at such time as the pointer remains on or above the high set point indicator 50 and the contacts CL remain closed only at such time as the pointer remains on or below the low set point indicator 52. Control knobs 54 and 56 are provided for regulating the positions of the set point indicators 50 and 52, respectively. It should be borne in mind that the circuitry by means of which the contacts CH and CL are actuated is associated with the load meter 40 as furnished for use in connection with the present invention. The control relay circuitry which has been developed in connection with the present invention is external circuitry, the operation of which is dependent upon closure and opening of the contacts CH and CL and will be described in detail presently.

Referring now to the circuit diagram portion of the single view of the drawing, upon closure of the master switch MS, current will be made available to the power lines L and L1 from a suitable source S which may be a commercial power line. Then, upon closure of the cone feeder switch CFS, current will flow from the line L, through a lead 11, the switch CFS, leads 13, 15, the electric motor M, a lead 17, and load meter 40 back to the line L1. Thus, closure of the switch CFS will initiate rotation of the hopper 10. Initial closure of the master switch MS will supply full line voltage from the lines L1 and L2 directly to the load meter (dynamometer) 40 through a connection 58 while a measurement of the current which is in effect consumed by the motor M will be supplied to and from said load meter through the lead 19 and a lead 21. Thus, with both current and voltage measurements being supplied to the load meter 40, a measure of the power in watts will be sensed thereby.

Assuming for purposes of illustration that the hopper 10 is half full at the time that the switches MS and CFS are closed and that the door 34 of the mixing apparatus 30 is closed so that no material is being fed to the hopper, the only function that will take place is a gradual runout of the material through the relatively small material-discharging opening 14 by reason of the fact that the hopper 10 continues to rotate. The set point 52 will have been adjusted previously to a point on the arcuate scale 44 which represents a nearly empty condition of the hopper where replenishing of the supply of material therein is desirable to avoid a complete runout. Such a condition is illustrated by the low point level which is shown as a dotted line near the bottom of the hopper 10 and is so labelled. This gradual runout of material from the hopper 10 will continue to take place until such time as the level of material in the hopper reaches the aforementioned low point line, at which time the pointer 46 of the load meter 40 will register with the set point indicator 52 on the scale 44 and the low set point contacts CL will immediately become closed. Upon closure of the contacts CL, a circuit will be completed from the line L, through a pair of leads 23 and 25, a relay magnet RML, a pair of leads 27 and 29, the contacts CL, and a lead 31 back to the line L1. Energization of the magnet RML will cause closure of its #1 and #2 contacts, the #1 contacts constituting holding contacts for maintaining the magnet RML energized. The holding circuit for such magnet extends from the line L, through leads 23 and 25, the magnet RML, the lead 27, a pair of leads 33 and 35, the contacts of the relay magnet RMH, a lead 37, the #1 holding contacts of the magent RML, and a pair of leads 39 and 41, back to the line L1. Closure of the #2 contacts of the magnet RML will establish a circuit through the electromagnet DM, the circuit extending from the line L, through the lead 23, a pair of leads 43 and 45, the #2 contacts of the magent RML (now closed), a lead 47, the magnet DM, and a lead 49, the lead 41 back to the line L1. Upon energization of the magnet DM, the core 36 will be shifted to the left as viewed in the single view of the drawing and the door 34 will be moved away from the opening 32 so that material from the mixer 30 will be forced outwardly through the side opening 32 in the bowl of the mixing apparatus 30 and fall by gravity into the relatively large material-receiving opening 12 of the feed hopper 10.

It is to be noted at this point that the contacts of the electromagnet RMH are labelled "delayed" which is to indicate that these contacts are slow to open so that the holding circuit for the relay magent RML is not opened precisely at the moment that the pointer 46 reaches the high set point indicator 50. The reason for causing the contacts of the relay magnet RMH to be of the slow-to-open or delayed type is that the material issuing from the mixing apparatus 30 is not consistent and it very often contains large and heavy lumps. Thus, in the event that a relatively heavy lump of material falls into the cone-type feed hopper 10, the added power necessary to overcome the inertia of such lump before it is broken up by turbulence in the hopper may induce a sudden surge of the pointer 46 beyond the high set point indicator 50 and, in the absence of the delayed action of the contacts of the magnet RMH, the door 34 might become prematurely closed. An additional factor that might cause such premature closing of the door 34 is the starting torque of the motor at the time that the switch CFS is closed. Where less viscous material is being fed by the hopper 10, the delayed action contacts may not be necessary, but in any event, their inclusion in the system has little effect on the over-all function of the system since the delay period is not long enough to bring the level of the material in the hopper to a condition of hopper overflow.

Assuming that batch feeding operations are desired to accommodate the various cycles of operation of the pasting machine beneath the cone-type feed hopper 10 and that the size of the door-controlled side opening 32 of the mixing apparatus 30, the capacity of the feed hopper 10, the size of the material discharge opening 14 at the lower end of the hopper, the rate of rotation of the motor M and various other factors will be constructed or adjusted so that the runout rate of material from the feeder 10 is appreciably less than the infeed rate from the mixer 30 to the end that upon opening of the door 34 there will be a gradual rising of the level of material in the hopper 10. Such rising of the level of material in the hopper 10 will continue despite the fact that as soon as the pointer 46 moves beyond the low set point indicator 52 the contacts CL will become open. Opening of such contacts is without function due to the previously described holding circuit which is associated with the relay magnet RML and involving the #1 contacts of such magnet. Rising of the level of material in the feed hopper 10 will continue until such time as the material reaches the high point as represented by the dotted line so labelled in the drawing. At this time, the pointer 46 of the load indicator 40 will register with the high set point indicator 50 on the scale 44. At this time, the contacts CH will become closed and a circuit will extend from the line L, through leads 23, 43 and 51, the relay magnet RMH, a lead 53, the contacts CH, and a lead 55, back to the line L1. Energization of the magnet RMH will cause opening of the contacts which are associated therewith, thus opening the previously described holding circuit for the relay magnet RML and allowing the magnet RML to become deenergized.

Such deenergization of the relay magnet RML will allow the #2 contacts thereof to open, thereby opening the previously described circuit through the electromagnet DM and causing the door to become closed with resultant discontinuance of the feed of material to the feed hopper 10. In this manner, a possible overflow of the hopper is prevented.

Since the hopper 10 is continuously rotatable as long as the switch CFS remains closed, the now substantially fully loaded hopper 10 wil commence to flow from the discharge opening 14 to feed the pasting machine therebeneath and the level or height of material in the hopper will shortly fall below the high point (see dotted line so labelled) while the pointer 46 will fall below the high set point indication 50. At this time, the contacts CH will again become open, thereby deenergizing the relay magnet RMH and and restoring the circuitry to its original condition with the #1 and #2 contacts of the magnet RML and the contacts of the magnet RMH remaining open, the magnets RML, RMH and DM remaining deenergized and the door 34 closed. Runout of the material in the hopper 10 will again commence and continue as previously described until such time as the level of material again reaches the low point (see dotted line so labelled). The operation is repetitious insofar as batch feeding of material is concerned.

If substantially continuous material feeding is desired, the infeed and runout characteristics of the door 34 of the mixing apparatus and the discharge opening 14 of the hopper 10, together with the speed of rotation of the hopper 10 will be designed or regulated so that a substantially even balance between infeed and runout characteristics of the hopper is maintained. When this is done, the hopper is capable of operation at a mid-level condition of the material therein with the circuitry remaining inactive with all contacts open and all magnets deenergized until such time as the level of material reaches either the high point or the low point, at which time appropriate circuit operation as previously described will be initiated, either to close or open the door 34 as the case may be.

In order to permit manual opening of the door 34 when desired, as, for example, when the mixing apparatus 30 is idle and it is necessary to open the door for inspection or other purposes, a push button switch PB is disposed in a circuit extending from the line L, through leads 23, 25, the relay magnet RML, the leads 27, 33 and 57, the push button switch PB and a lead 59 back to the line L1. Energization of the magnet RML will close the #1 and #2 contacts thereof, thus energizing the magent DM as previously described and causing the door 34 to open.

It is to be distinctly understood that the specific circuitry which is disclosed herein is not necessarily the circuitry which will be used for causing the load meter 40 to sense the power which is exerted by the electric motor M in driving the feed hopper 10. A wide variety of other forms of circuitry may be devised which will accomplish the same functions, namely, that of utilizing the power exerted by the motor M as an indication of the quantity of material in the hopper 10 at any given moment, and consequently, of the height or level of such material, and then causing infeed operations to cease when a predetermined high point level is attained, or causing such infeed operations to be resumed when a predetermined low point level is reached. This, in essence, constitutes the basic principle of feature of the present invention.

The invention is not to be limited to the exact arrangement of parts shown in the accompanying drawing or described in this specification as various changes in the details of construction may be resorted to without departing from the spirit or scope of the invention. For example, although an electric motor M is shown herein as constituting the driving means for the hopper 10, other forms of motors may be employed, as, for example, an hydraulic or a pneumatic motor. In such an instance, the load meter (dynamometer) which is used to measure the power required to drive the motor will be in the form of an hydraulic or pneumatic dynamometer having connections to the motor which reflect both the back-up pressure at the motor and the fluid flow through the motor.

Additionally, whereas the present level control system has been described herein as being useful in connection with the feeding of lead oxide paste material, the system is by no means limited to such use and, if desired, various materials such as foundry sand which has been treated with a suitable binder, or a wide variety of industrial or commercial products which are to be found in the food or cosmetic industries may be fed by the hopper 10 and overflow conditions inhibited by use of the present control system. Therefore, only insofar as the invention is particularly pointed out in the accompanying claims is the same to be limited.

Having thus described the invention what I claim as new and desire to secure by letters patent is:

1. The combination with a vertically disposed, rotatably mounted, feed hopper having a relatively large open upper end for the infeed of flowable material, and a relatively small open end for discharge of such material, an electric motor operatively connected in driving relationship to said hopper, means establishing a supply of the material for delivery to the hopper, and gate means effective when open to admit material from said supply to the hopper, of a level control system effective to to give an indication of the quantity of material in the hopper during rotation of the latter and at any given instant in order that said gate means may be shifted as a result of said indication from its open to its closed position when the quantity of material in the hopper attains a predetermined maximum, said system embodying a load meter in the form of a dynamometer operatively connected to said motor and having a visible readout in the form of a movable pointer and scale combination, said pointer and scale combination being responsive to the voltage supplied to said motor, and also being responsive to the current consumed by the motor, and thus being responsive to the power expended by the motor in driving said hopper.

2. The combination set forth in claim 1 and including, additionally, means automatically effective when the power exerted by the motor in driving relationship reaches a predetermined maximum for automatically effecting closure of said gate means with resultant cut-off of flow of material from the supply means to the hopper, and means automatically effective when the power exerted by said motor in driving said hopper reaches a predetermined minimum for effecting opening of said gate means in order to supply further material to said hopper and thus prevent complete material runout from the hopper.

3. The combination set forth in claim 1, wherein said dynamometer is provided with a low set point and a first pair of normally open contacts effective to become closed when said readout falls below said low set point, and first relay means is effective upon closure of said first pair of contacts for effecting opening of said gate means to supply further material from said supply means to said hopper and prevent complete material runout from the hopper, and wherein said dynamometer is further provided with a high set point and a second pair of normally open contacts effective to become closed when the readout exceeds with high set point, and second relay means is effective upon closure of said second pair of contacts for effecting closure of said gate means to prevent material overflow from said hopper.

4. The combination set forth in claim 3 and wherein manually operable means is provided for actuating said first relay means to effect opening of said gate means at will.

5. The combination set forth in claim 3 and wherein said second relay means is of the delayed action type and serves to prevent momentary power surges in the motor from effecting immediate opening of said door.

* * * * *